United States Patent [19]

Alvino et al.

[11] Patent Number: 4,642,170
[45] Date of Patent: Feb. 10, 1987

[54] ELECTROPHORETIC DEPOSITION OF SULFONE-CONTAINING POLYMERS

[75] Inventors: William M. Alvino, Penn Hills Township, Allegheny County, Pa.; Timothy J. Fuller, Berkeley Heights, N.J.; Louis A. Cargnel, Unity Township, Westmoreland County; Luciano C. Scala, Murrysville, both of Pa.

[73] Assignee: Westinghouse Electric Corp., Pittsburgh, Pa.

[21] Appl. No.: 765,464

[22] Filed: Aug. 14, 1985

[51] Int. Cl.$^4$ .............................................. C25D 13/06
[52] U.S. Cl. ................................ 204/181.4; 204/181.6
[58] Field of Search ................ 204/181.4, 181.6, 181.7

[56] References Cited

U.S. PATENT DOCUMENTS

| | | | |
|---|---|---|---|
| 3,812,069 | 5/1974 | Boldebuck | 204/181.6 |
| 3,850,734 | 11/1974 | Parekh et al. | 204/181.6 |
| 3,850,735 | 11/1974 | Parekh et al. | 204/181.6 |
| 4,003,812 | 1/1977 | Scala et al. | 204/181.6 |
| 4,533,448 | 8/1985 | Scala et al. | 204/181.7 |

Primary Examiner—Terryence Chapman
Attorney, Agent, or Firm—R. D. Fuerle

[57] ABSTRACT

Disclosed is a method of electrophoretically depositing a coating of polysulfones or polyethersulfones on a conductive substrate. An amine-free solution is formed in an organic solvent of the polysulfones or polyethersulfones. An emulsion is formed by combining the solution with an organic non-solvent for the polymer which contains up to about 0.6 parts by weight of an organic nitrogen containing base per parts by weight of the polymer. A direct current is applied between a conductive substrate and the emulsion which results in the deposition of the polymer on the substrate.

13 Claims, No Drawings

ELECTROPHORETIC DEPOSITION OF SULFONE-CONTAINING POLYMERS

BACKGROUND OF THE INVENTION

There is much interest in developing electrophoretic deposition systems that can be used to provide flaw-free coatings for electrical components and high performance applications. Aqueous electrodepositions have been known for at least fifty years, but are limited to resins possessing suitable functionality to convert them to water dispersible systems suitable for electrodeposition. Typical polymers include epoxy resins, acrylics, carboxylic acid polymers, and vinyl acetate-maleic acid copolymers. These materials are rendered water dispersible by reaction with amines to form their respective salts. Recent studies have led to the development of electrodeposition systems of high performance polymers in non-aqueous media. Even in these systems the presence of amine was a necessary component in order to prepare suitable electrophorettable emulsions.

One class of polymers that has been converted to an electrophorettable system is the polysulfones. Complete details of the preparation of these polymers and their conversion to electrophoretic emulsions can be found in U.S. Pat. No. 4,003,812.

The use of polysulfone polymers as electrodeposition systems offers many advantages compared to carboxyl-containing resins. Some of these advantages include elimination of the very high temperatures such as those required for polyimides (300° to 350° C.), the fact that the polysulfones do not produce condensation products as do polyimides, their lower cost, their good electrical properties, and the elimination of the copper chelation that occurs with carboxyl containing polymers, which has a deleterious effect on coating properties.

While the system described in U.S. Pat. No. 4,003,812 produces satisfactory polysulfone coatings, research has continued on ways of improving the system by eliminating components or processing steps, or producing coatings with better properties.

SUMMARY OF THE INVENTION

We have discovered an improved method of electrophoretically depositing a polysulfone-containing coating on a conductive substrate. In the method of this invention, an amine or organic nitrogen-containing base is entirely omitted or, if it is included, it is used at lower concentrations than are used in U.S. Pat. No. 4,003,812. In addition, while U.S. Pat. No. 4,003,812 stresses the criticality of adding the amine to the polysulfone, then adding that solution to the non-solvent, we have found that the amine can be added to the non-solvent instead. We have also found that the emulsion can be formed without the slow and careful addition of the solution of the polymer to the non-solvent and the heating which is described in U.S. Pat. No. 4,003,812. As a result of these changes in the composition of the emulsion and the method of forming the emulsion, we have found that the resulting emulsion is superior in clarity and stability and that the resulting coating is of better quality than is produced according to prior processes.

DESCRIPTION OF THE INVENTION

Polymers that can be electrodeposited according to the process of this invention are those containing sulfone groups, ethersulfone groups, or mixtures thereof. These polymers can generally be described by the formula:

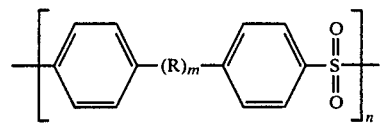

where R is oxygen, sulfur, alkyl to $C_5$, or mixture thereof, m is 0 or 1, and n is 20 to about 500. Common terminal groups include hydroxyl and phenyl. In the general formula, R is preferably oxygen and m is preferably 1 as these compounds produce more flexible coatings that have higher thermal stability.

The polymer is dissolved in an organic solvent, preferably an aprotic solvent because of their greater solvent power. The solvent should be a non-aqueous liquid that is non-gassing (i.e., non-electrolizable). Suitable solvents include N,N-dialkylcarboxylamides such as dimethyl acetamide, and dimethyl formamide. Other useful solvents include N-methyl-2-pyrrolidone, dimethyl sulfoxide and pyridine. Mixtures of solvents can also be used.

The non-solvent is an organic liquid in which the polymer is not soluble. The non-solvent and the solvent are preferably miscible, however, as this results in better dispersion. The non-solvent should also be non-gassing. Suitable examples of non-solvents include low molecular weight aliphatic (straight and branched chains) and aromatic ketones containing about 3 to about 18 total carbon atoms such as, for example, acetone, methyl isobutyl ketone, methyl ethyl ketone, methyl-n-propyl ketone, diethyl ketone, mesityl oxide, cyclohexanone, methyl n-butyl ketone, ethyl n-butyl ketone, methyl n-amyl ketone, acetophenone, methyl-n-hexyl ketone, isophorone and di-isobutyl ketone. Non-ketones such as acetonitrile are also useful as non-solvents. Mixtures of non-solvents can also be used.

The emulsion is formed by mixing together the solution of the polymer and a non-solvent for the polymer. We have found that no heat is required to produce the emulsion, nor is it necessary to add the components together at a very slow rate, though some stirring is helpful.

It is preferable that no base be used in forming the emulsion according to this invention, because a base adds to the material and processing expense and makes the solution more conducting. However, up to about 0.6 pbw of a basic organic non-aqueous nitrogen-containing compound for every pbw of polymer can be used in forming the emulsion. If a base is used, it is added to the non-solvent and not to the solution of the polymer. We have found that adding the base to the non-solvent instead of adding it to the polymer solution results in the emulsion having improved clarity and stability, and produces a superior quality coating. Examples of suitable bases that can be used in this invention include secondary and tertiary aliphatic and aromatic amines such as, for example, trimethylamine, triethylamine, N,N-dimethylbenzylamine, tri-n-propylamine, tri-n-butylamine, N-ethylpiperidine, N-allylpiperidine, N-ethylmorpholine, N,N-diethyl-m-toluidine, N,N-diethyl-p-toluidine, N-allylmorpholine, N,N-diethylaniline, pyridine, imidazole, 1-methylimidazole, 4-methylimidazole, 5-methylimidazole, 1-propylimidazole, 1,2-dimethylimidazole, 1-ethyl-2- methylimidazole, and 1-phenylimidazole; mixtures of bases can also be used.

In forming the emulsion of this invention, the volume ratio of non-solvent to solvent should be about 1 to about 8, and is preferably about 3.5 to about 5, because if less non-solvent is used, less polymer precipitates out and thus the amount of polymer deposited on the substrate decreases, and if more non-solvent is used the emulsion may become unstable. The amount of solids should be about 0.1 to about 1% by weight (based on the total emulsion weight), and is preferably about 0.4 to about 0.7% by weight, as an emulsion containing fewer solids is uneconomical and will result in a thin coating, and an emulsion containing more solids may be unstable. In the emulsion, the polymer solution forms the discontinuous phase and the non-solvent forms the continuous phase. No emulsifier is needed, although a base, if used, will tend to act as an emulsifier.

The substrate on which the polymer is deposited can be made of any conducting material, including various metals as well as graphite, boron, or silicon. It can be in the form of flat sheets, various complex shapes, wires, or any other shape. The substrate is made the anode and an electrode immersed in the emulsion is made the cathode. Generally, about 1 to about 400 volts DC, and preferably about 25 to about 250 volts DC, are suitable for depositing a coating in a reasonable time. U.S. Pat. No. 4,003,812, herein incorporated by reference, discloses various other aspects of the electrodeposition of polysulfones from emulsions.

EXAMPLE 1

Five grams of a polysulfone having a molecular weight of 22,400, sold by ICI Chemical Co. under the trade designation "Vitrex 300P" at 100% solids, was dissolved in 150 ml N-methyl pyrrolidone (NMP). This solution was poured into a rapidly stirred solution of 700 ml of acetone containing 1.7 gms of triethylamine (TEA). A white opaque emulsion formed. The emulsion had a non-solvent to solvent ratio by volume of 4.66, a solids content of 0.7 wt.%, and an amine to polymer wt. ratio of 0.34. A flat aluminum electrode 3"×6" was immersed to a depth of 2.5" into the emulsion. The counter electrodes were nickel screens and the electrode separation was 1.5". A DC potential of 300 V was applied for various times. At the end of the time period, the electrode was removed and the coated electrode (the anode) was heated at a temperature that increased from room temperature to 250° C. over a period of approximately ½ hr. The results of this experiment are shown in Table I.

TABLE I

| Time | Current mA | Coating Thickness, mils |
| --- | --- | --- |
| 30 sec | 52 → 48 | <0.8 |
| 45 sec | 49 → 44 | 1.0 |
| 60 sec | 48 → 42 | 1.2 |

EXAMPLE 2

The emulsion in Example 1 was allowed to stand at room temperature for four days and electrodeposition was carried out again as described above. No precipitate had formed in the emulsion during this time. The results of this experiment are shown in Table II.

TABLE II

| Time | Current mA | Coating Thickness, mils |
| --- | --- | --- |
| 10 sec | 37 → 35 | <0.2 |
| 15 sec | 37 → 36 | " |
| 20 sec | 39 → 37 | " |

EXAMPLE 3

A pale opaque white homogeneous emulsion was prepared which contained 3 gms of "Victrex 300P," 150 ml NMP, 700 ml acetone, and 1.7 g TEA. The non-solvent to solvent volume ratio was 4.66, the amine to polymer wt. ratio was 0.56, and the solids wt.% was 0.42. Electrodeposition was carried out on this emulsion at 300 Vdc in a manner described in Example 1. The results of this experiment are shown in Table III.

TABLE III

| Time | Current mA | Coating Thickness, mils |
| --- | --- | --- |
| 3 min | 42 → 30 | 1 |
| 5 min | 38 → 25 | 1½ |
| 10 min | 33 → 19 | 1¾ |

EXAMPLE 4

In another experiment, an emulsion was prepared without using amine. Five gms of "Victrex 300P" were dissolved in 150 ml of NMP and this solution was poured into 700 ml of rapidly stirred acetone. A homogeneous white opaque emulsion formed. Electrodeposition was carried out as described in Example 1. These results are shown in Table IV.

TABLE IV

| Time | Current mA | Coating Thickness, mils |
| --- | --- | --- |
| 30 sec | 48 → 42 | 0.4 |
| 60 sec | 44 → 40 | 0.9 |
| 120 sec | 48 → 39 | 2.2 |

The coated aluminum panel was heated in an oven at a temperature that increased from room temperature to 250° C. for ½ hr, and then was held at 250° C. for 1 hr. The film on the panel was homogeneous and strong.

The emulsion was allowed to age 24 hrs. at room temperature and electrodeposition was carried out again at 300 Vdc. These results are shown in Table V.

TABLE V

| Time | Current mA | Coating Thickness, mils |
| --- | --- | --- |
| 15 sec | 48 → 45 | 0.3 |
| 20 sec | 48 → 45 | 0.4 |
| 60 sec | 31 → 27 | 0.5 |
| 120 sec | 15 → 12 | 0.6 |

Coatings were cured in the manner described in Example 1.

EXAMPLE 5

In this example, dimethyl sulfoxide (DMSO) was substituted for NMP and no amine was used. Five gms of "Victrex 300P" were dissolved in 150 ml of DMSO and added to 700 ml of rapidly stirred acetone. A homogeneous white opaque emulsion formed. Electrodeposition was carried out as described in Example 1. The results are shown in Table VI.

TABLE VI

| Time | Current mA | Coating Thickness, mils |
| --- | --- | --- |
| 30 sec | 38 → 31 | 0.5 |
| 60 sec | 38 → 30 | film white & bubbly |
| 120 sec | 38 → 30 | film white & bubbly |

In Examples 1 through 5 it has been demonstrated that polysulfone polymers can be made into stable emulsions useful for electrophoretic deposition without the use of an amine in the emulsion composition. It has further been demonstrated that if one chooses to use an amine, it does not have to be heated with the polymer solution prior to adding the polymer solution to the precipitant. All that is necessary is that the amine be added to the precipitant and then the polymer solution is added. Stable electrophorettable emulsions will then be obtained.

Although quantitative studies were not performed, an approximation of the coulombic yields can be calculated from the data in Tables I and IV. From these data, the number of coulombs is the current (amps) times the time (sec); the mass of the deposited coating can be obtained from the following formula:

Mass (gms) = Density (g/cc) × Area (cm$^2$) × 0.00254 cm/mil × Thickness (mils).

The calculated results are shown in Table VII.

TABLE VII

| No. | Amine | Current (amps.) | Time (sec) | Coulombs | Mass (gms) Deposited | Coulombic Efficiency Z mg/C |
| --- | --- | --- | --- | --- | --- | --- |
| 1 | Yes | 0.050 | 30 | 1.5 | 0.2694 | 179 |
| 2 | Yes | 0.465 | 45 | 2.09 | 0.3364 | 160 |
| 3 | Yes | 0.045 | 60 | 2.7 | 0.4037 | 149 |
| 4 | No | 0.045 | 30 | 1.35 | 0.1345 | 100 |
| 5 | No | 0.042 | 60 | 2.52 | 0.3028 | 120 |
| 6 | No | 0.0435 | 120 | 5.22 | 0.7402 | 142 |

We claim:

1. A method of electrophoretically depositing a coating on a conductive substrate comprising:
   (A) forming, in an organic solvent, an amine-free solution of a polymer selected from the group consisting of polysulfones, polyethersulfones, and mixtures thereof;
   (B) forming an emulsion by combining said solution with an organic non-solvent for said polymer containing up to 0.6 pbw of an organic nitrogen-containing base per pbw of said polymer; and
   (C) applying a direct current between said conductive substrate and said emulsion, whereby a coating of said polymer is deposited on said conductive substrate.

2. A method according to claim 1 wherein said solution and said non-solvent are combined rapidly.

3. A method according to claim 1 wherein said emulsion is formed without heating.

4. A method according to claim 1 wherein the amount of said organic nitrogen-containing base in said non-solvent is zero.

5. A method according to claim 1 wherein said polymer has the general formula

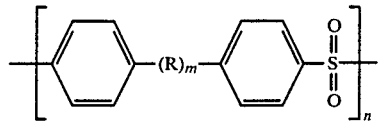

where R is selected from the group consisting of oxygen, sulfur, alkyl to $C_5$, and mixtures thereof, m is 0 to 1, and n is 20 to 500.

6. A method according to claim 5 wherein R is oxygen and m is 1.

7. A method according to claim 1 wherein said solvent is selected from the group consisting of N, N-dialkylcarboxylamides, N-methyl-2-pyrrolidine, dimethyl sulfoxide, pyridine, and mixtures thereof.

8. A method according to claim 1 wherein said organic nitrogen-containing base is selected from the group consisting of trimethylamine, triethylamine, N,N-dimethylbenzylamine, tri-n-propylamine, tri-n-butylamine, N-ethylpiperidine, N-allylpiperidine, N-ethylmorpholine, N-N-diethyl-m-toluidine, N-diethyl-p-toluidine, N-allylmorpholine, N,N-diethylaniline, pyridine, imidazole, 1-methylimidazole, 4-methylimidazole, 5-methylimidazole, 1-propylimidazole, 1,2-dimethylimidazole, 1-ethyl-2-methylimidazole, 1-phenylimidazole, and mixtures thereof.

9. A method according to claim 1 wherein said organic non-solvent is selected from the group of ketones consisting of acetone, methyl isobutyl ketone, methyl ethyl ketone, methyl n-propyl ketone, diethyl ketone, mesityl oxide, cyclohexanone, methyl-n-butyl ketone, ethyl-n-butyl ketone, methyl-n-amyl ketone, acetophenone, methyl-n-hexyl ketone, isophorone, di-isobutyl ketone, and mixtures thereof.

10. A method according to claim 1 wherein said non-solvent is miscible with said solvent.

11. A method of electrophoretically depositing a coating on a conductive substrate comprising:
   (A) forming, in an organic solvent, an amine-free solution of a polyethersulfone;
   (B) forming an emulsion with said solution as the discontinuous phase, by combining said solution with an amine-free organic non-solvent for said polyethersulfone which is miscible therewith, wherein the volume ratio of said non-solvent to said solvent is about 1 to about 8 and the solids content of said emulsion is about 0.1 to about 1% by weight; and
   (C) applying about 1 to about 400 Vdc between said conductive substrate as an anode and an inert electrode immersed in emulsion as a cathode, whereby a coating of said polyethersulfone is deposited on said conductive substrate.

12. A method according to claim 11 wherein said volume ratio of said non-solvent to said solvent is about 3.5 to about 5.

13. A method according to claim 11 wherein said solids content of said emulsion is about 0.4 to about 0.7% by weight.

* * * * *